US006600829B1

(12) United States Patent
Affeldt et al.

(10) Patent No.: US 6,600,829 B1
(45) Date of Patent: Jul. 29, 2003

(54) COMPUTER PROCESS FOR CONTROLLING A SYSTEM FOR SORTING OBJECTS BY SURFACE CHARACTERISTICS

(75) Inventors: Henry A. Affeldt, Apple Valley, CA (US); Marina L. Cariaga, Victorville, CA (US); Tim D. Conway, Stockton, CA (US); David M. Musoke, Alta Loma, CA (US); James B. Sheffler, Chino Hills, CA (US); Steven D. Stebbins, Patton, CA (US)

(73) Assignee: Sunkist Growers Inc., Ontario, CA (US)

( * ) Notice: Subject to any disclaimer, the term of this patent is extended or adjusted under 35 U.S.C. 154(b) by 0 days.

(21) Appl. No.: 09/027,177

(22) Filed: Feb. 20, 1998

(51) Int. Cl.[7] .................................................. G06K 9/00

(52) U.S. Cl. ........................ 382/110; 209/509; 209/580; 209/587

(58) Field of Search .......................... 382/110; 209/580, 209/587, 939, 3.1, 44.1, 44.4, 509, 510, 581; 348/127, 128, 131, 164

(56) References Cited

U.S. PATENT DOCUMENTS 5,537,628 A * 7/1996 Luebbert .................... 395/144
5,732,147 A * 3/1998 Tao ............................ 382/110
5,793,879 A * 8/1998 Benn et al. ................. 382/110
5,845,002 A * 12/1998 Heck et al. ................. 382/110
5,887,073 A * 3/1999 Fazzari et al. .............. 382/110

* cited by examiner

*Primary Examiner*—Timothy M. Johnson
*Assistant Examiner*—Abolfazl Tabatabai
(74) *Attorney, Agent, or Firm*—Sheppard, Mullin, Richter & Hampton LLP

(57) ABSTRACT

The computer process controls operation of a system which sorts objects by surface characteristics. The system includes a multi-rail conveyor, an imaging unit for each rail of the conveyor and a computer including a user interface. Each imaging unit includes at least one camera, and at least one block of LEDs of multiple predetermined colors.

The process initializes system hardware and software, calibrates the imaging units, sets, tests and reports various parameters for imaging, automatically or under user control, and synchronizes the operation of the imaging units with conveyor action to produce optimal imaging, as well as controlling sorting based upon imaging output.

24 Claims, 7 Drawing Sheets

COMPUTER PROCESS FOR CONTROLLING A SYSTEM FOR SORTING OBJECTS BY SURFACE CHARACTERISTICS

BACKGROUND OF THE INVENTION

1. Field of the Invention

The present invention relates to a system for sorting objects by surface characteristics which is operated through control of a computerized process. More specifically, the process controls the sorting of objects such as citrus fruits based on color and blemish parameters which are sensed, analyzed, classified by levels of acceptability, and transformed into machine readable code for eliciting desired physical responses from mechanical apparatus of the system to group objects having similar parameters together for further processing.

2. Description of Prior Art

Heretofore, an apparatus for sensing and analyzing surface characteristics of objects has been disclosed.

One such system is described in copending U.S. application Ser. No. 08/326,169 filed Oct. 19, 1994 and entitled Apparatus for Sensing and Analyzing Surface Characteristics of Objects, the teachings of which are incorporated herein by reference.

The copending application defines the apparatus thereof as being operable under control of a central processing unit (computer) which is programmed to accomplish the process.

SUMMARY OF THE INVENTION

A computer process which controls operation of a system for sorting items by surface characteristics is disclosed hereinbelow.

DESCRIPTION OF THE PREFERRED EMBODIMENT

As stated hereinbefore a system 200 for sorting objects for surface characteristics which the computer 210 operated process of the present invention controls is described in co-pending U.S. patent application Ser. No. 08/326,169, the teachings of which are incorporated herein by reference.

Figure 1:
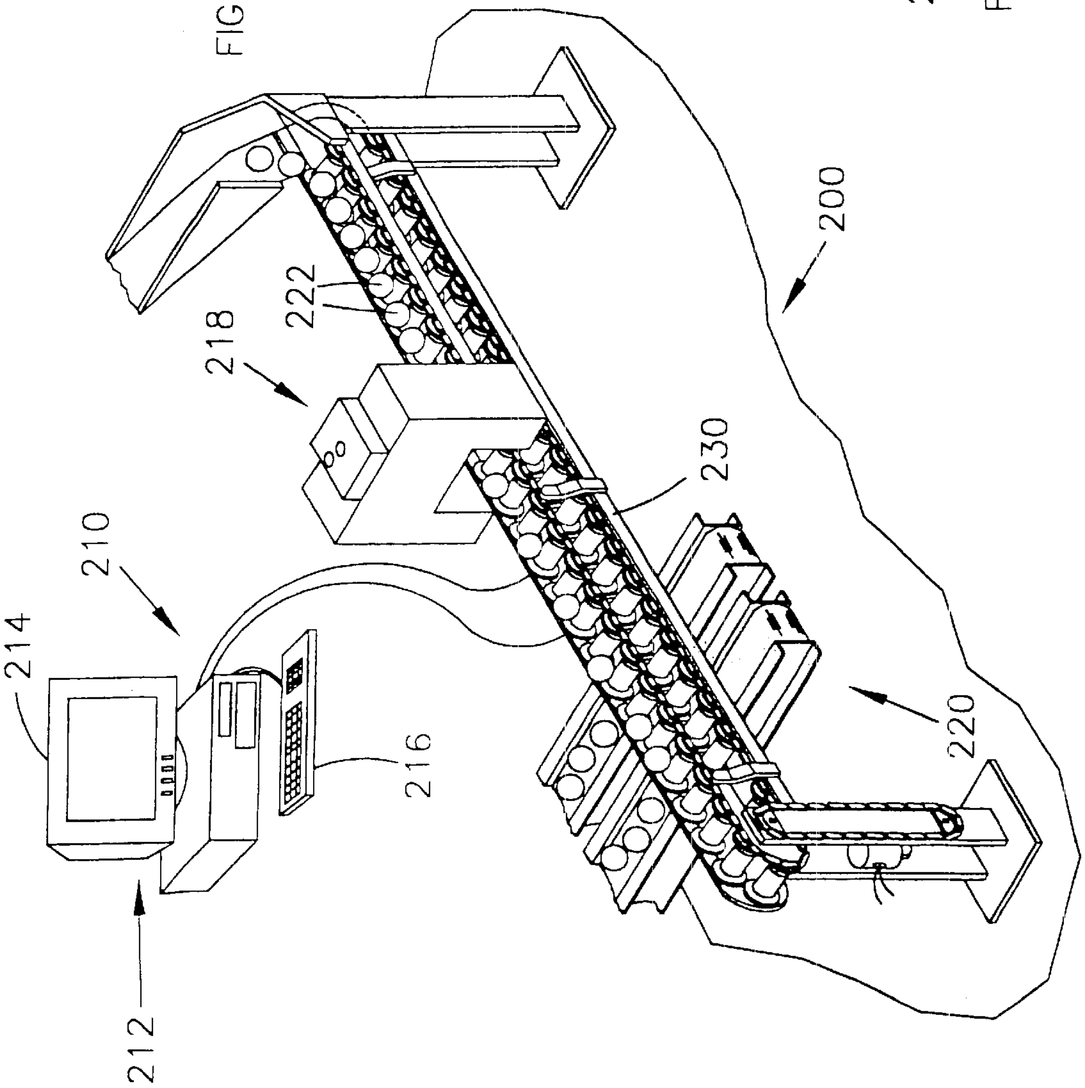
FIG. 1 is a perspective view of a sorting system which includes a computer programmed to carry out at least one process for controlling operation of a mechanical conveyor type sorter and cooperating imaging apparatus, the system further incorporating a user interface by means of which operational parameters can be set by a user and further by means of which failures of the system are reported to the user.

As illustrated in FIG. 1 a computer 210 having a user interface 212 (comprising a monitor 214 and a keyboard 216 or the like) is programmed to process input and generate output which controls the function of an imaging unit 218 which operates in tandem with a conveyor type sorting apparatus 220 to provide the sorting system 200 for objects 222 such as fruit. The imaging unit 218 generates an image which the computer 210 process translates into code for producing desired system 200 operations. The imaging quantifies and qualifies color, size, blemish, shape and any other external characteristics of the fruit considered pertinent sorting parameters, and sorting of the fruit based on the imaging by the system 200 takes place under computer 210 control.

The user interface 212 is provided so that parameters of imaging may be modified by the user if so desired, and further so that errors detected during process operation may be related to the user to be dealt with.

Figure 2:
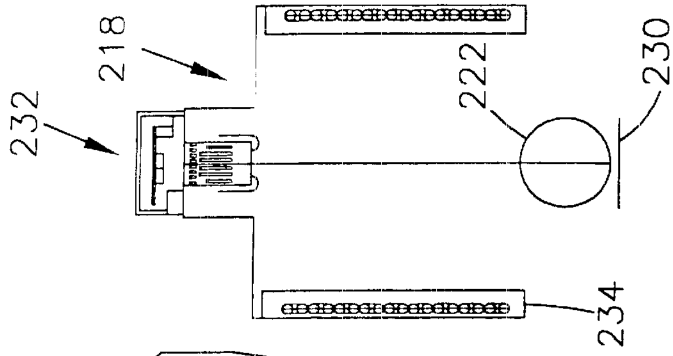
FIG. 2 is a more detailed study of one imaging apparatus or unit and a corresponding conveyor rail showing the imaging apparatus to contain at least a camera and at least a block of different colored light emitting diodes (LEDs) for lighting an object carried by the conveyor for imaging by the camera.

FIG. 2 provides a more detailed schematic diagram of an imaging unit 218 and corresponding conveyor rail 230, the imaging unit 218 being seen to comprise at least one imaging camera 232 and at least one block of light emitting diodes (LEDs) 234 which are of various predetermined colors for producing optimum imaging.

Figure 3:
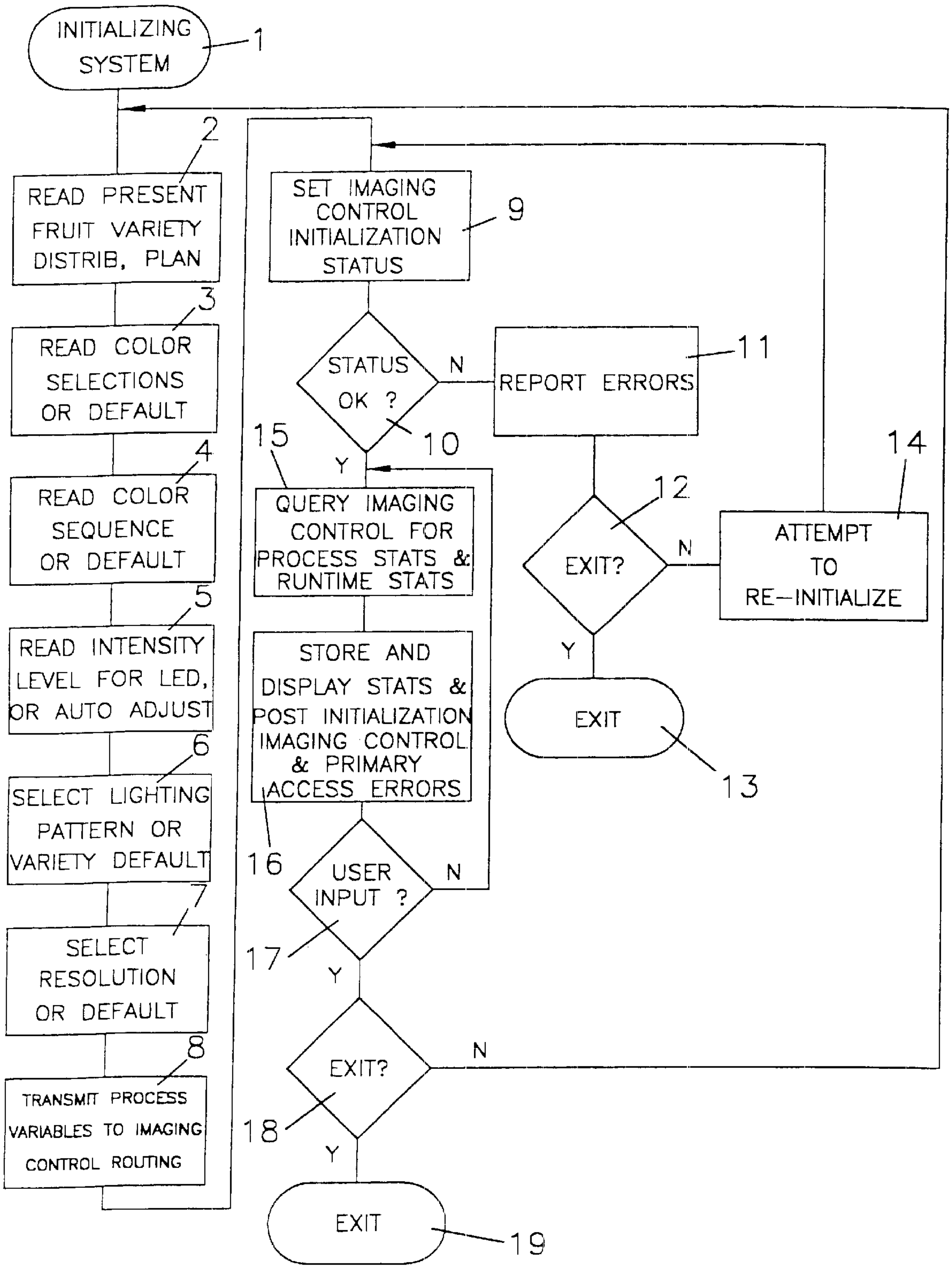
FIG. 3 is a logic flow diagram of the steps of a user interface initialization which runs as a background at all times during the computer controlled process for sorting objects by surface characteristics used to operate the system of the present invention.

FIG. 3 is a logic flow diagram of steps taken in initializing the user interface 212 of the system 200 which interacts with the imaging unit 218 under process control.

In step 1, the computer 210 is initialized, typically by providing power thereto.

In step 2, the process searches for a manual selection of a fruit variety, and if no user input is provided at the interface 212, the process defaults to the variety of fruit last imaged.

In step 3, the color selection is read and again, if no user input is present, the process defaults to the previous parameters presented.

In step 4, the color sequence is searched for use input and if none is found, again the process defaults to the last parameters provided.

In step 5, the process searches for input of an intensity level for the LEDs 234 of the imaging unit 218. If not input is found the intensity is automatically adjusted to a predefined default parameter.

In step 6, the lighting pattern is searched for user input, and if not input is present, the process defaults to a particular pattern which is fruit variety dependent.

In step 7, image resolution is searched for user input. If none is found the process defaults to the last setting.

It will be understood that the above parameter settings are each stored in a corresponding buffer. The settings are in machine readable code and the user interface 212 allows access to these buffers by the user for the purpose of customizing the process, if such customization is desired.

Likewise, when a parameter is said to be read, to have input thereto, etc., the action by the process or the user is taking place within a buffer.

Figure 5:
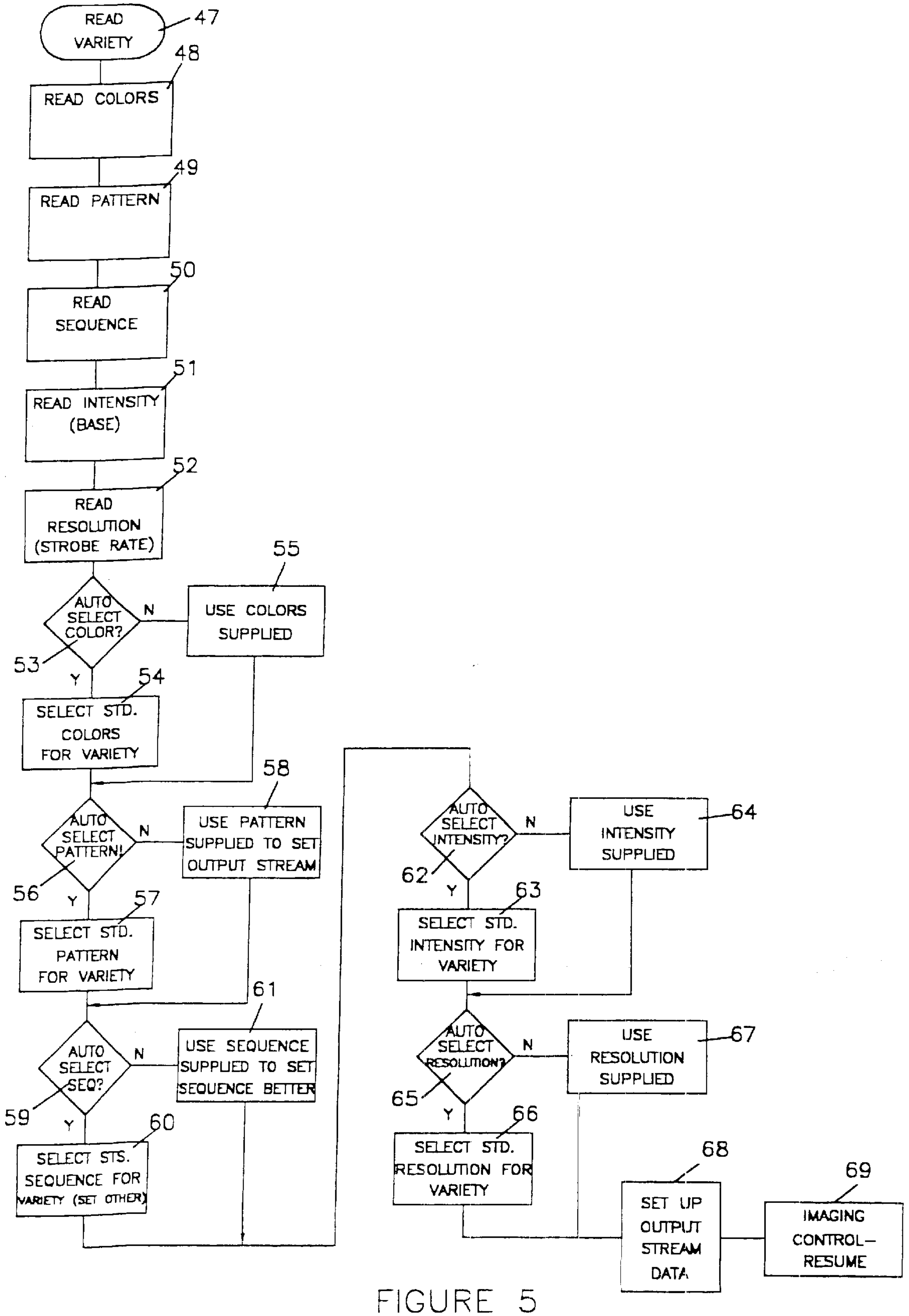
FIG. 5 is a logic flow diagram of the steps taken in analyzing settings for imaging control of the system and converting them to system readable code.

In step 8, once the settings for each of the parameters of the string have been determined they are transmitted to an input of the imaging control steps of FIG. 5.

Concurrently, in step 9, the initialization status of steps taken in imaging control is checked.

If an error is indicated, at step 10, the error is reported to the user on the interface 212 at step 11, and the user is queried at step 12 as to whether imaging control initialization should be exited or whether a reinitialization of imaging control is to be attempted.

If the user chooses to exit at step 13, imaging control initialization ends.

If on the other hand it is chosen not to exit, imaging control reinitialization is attempted at step 14 and a loop is created back to step 9.

Conversely, if the imaging control initialization status proves operability, the provision of processing and run time statistics is requested at step 15.

These statistics are not only displayed, but are also stored in a corresponding buffer at step 16, as are post initialization imaging control and primary access errors.

Next, at step 17, the process looks for user input at the interface 212. If input is not provided, a loop is created back to step 15.

If on the other hand user input is presented, at step 18 it is determined whether the input is an exit command.

A positive response may be input at step 18 by an appropriate keystroke or a user may simply power the computer 210 OFF at step 19.

If the response is negative, a loop is created back to step 2 and user interface 212 initialization continues looping in the background concurrently with running of the steps defined in FIGS. 4–8.

Figure 4:
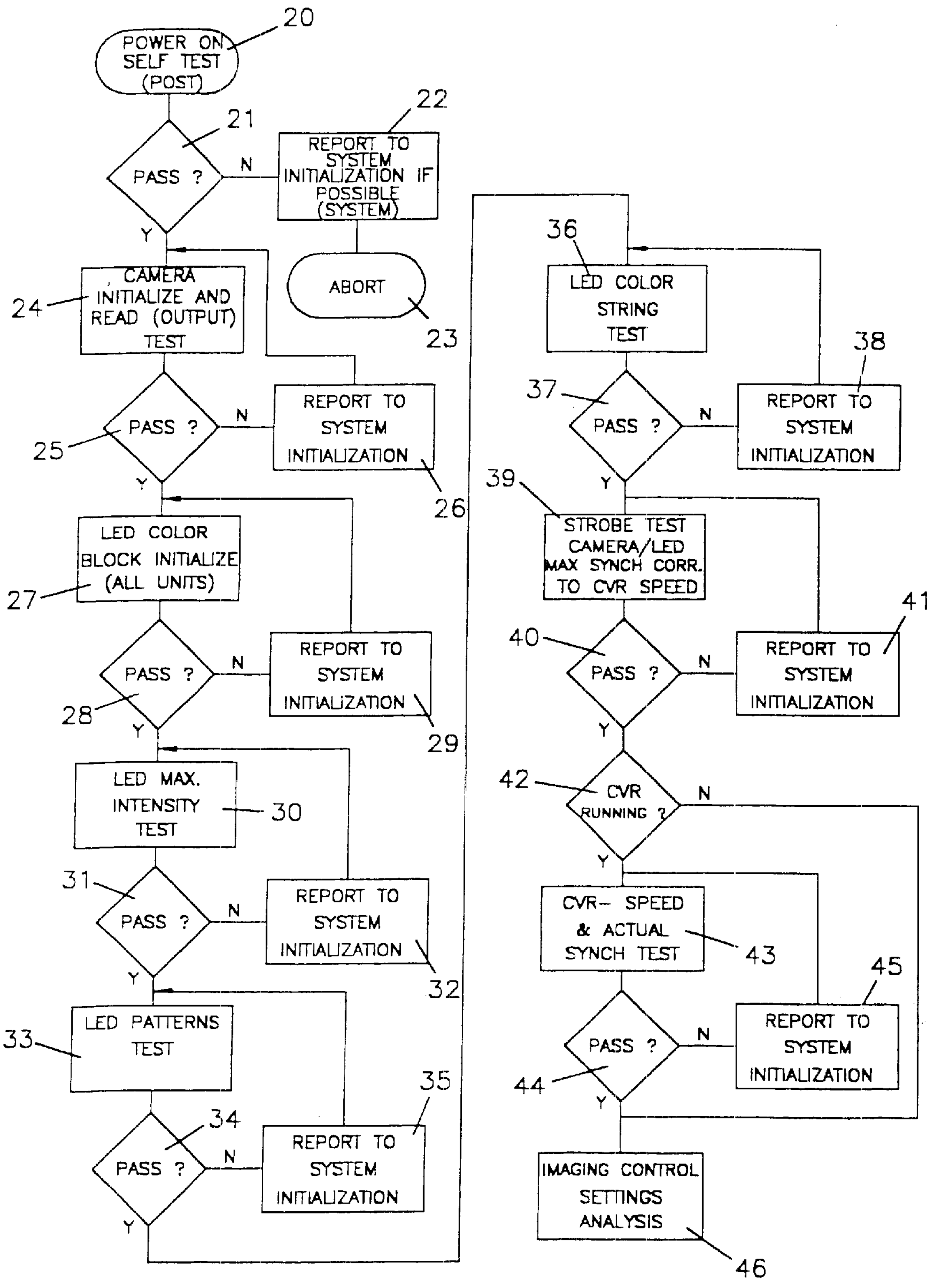
FIG. 4 is a logic flow diagram of the steps of a system initialization which runs concurrently and interacts with the initialization of FIG. 3.

FIG. 4 is a logic flow diagram of steps taken in initializing system 200 hardware components external of the computer 210 which run concurrently with the steps of FIG. 3.

In step 20, the system 200 is powered ON manually and a self test is performed, in known manner.

If at step 21, the imaging system fails the self test, a report is generated at step 22 and output to the user interface 212 at step 11 of FIG. 3 if possible and hardware initialization is aborted at step 23.

It will be understood that if, for example, the hardware of the system 200 has no power supplied thereto, an error message will not be generated but initialization will still abort.

If the hardware of the system 200 passes the self test, each camera 232 of each imaging unit 218 is initialized and output readings from each camera 232 to the interface 212 are tested at step 24.

If output from the camera 232 is found inappropriate at step 25, an error is reported at step 26 and is output on the user interface 212 at step 11 of FIG. 3.

If the imaging system camera 232 pass the test, the LEDs 234 are tested by color block at step 27.

If a failure occurs at step 28, a report is generated at step 29 and is output to the user interface 212 at step 11 of FIG. 3.

If the LED 234 blocks are functioning, the process tests for maximum LED 234 intensity produced by the blocks at step 30.

If the result is below a desired level at step 31, an error is reported at step 32 and is output to the user interface 212 at step 11 of FIG. 3.

If the intensity level is acceptable, the process then tests LED 234 synchronization patterns at step 33. A failure at step 34 is reported at step 35 and is output to the user interface 212 at step 11 of FIG. 3.

If the test results are positive, the LEDs 234 are tested by color string at step 36. If a failure results at step 37, a report is generated at step 38 and is output to the user interface 212 at step 11 of FIG. 3.

If the test is successful, maximized strobing to the LEDs 234 in synchronization with camera 232 activation corresponding to maximized hypothetical conveyor 220 speed is tested at step 39. Failure at step 40 will generate a report at step 41 which is output to the user interface 212 at step 11 of FIG. 3.

If the test is successful, the running status of the conveyor 220 is determined at step 42.

If the conveyor 220 is not running the process initiates at step 46 an imaging control setting analysis, the steps of which are set forth in FIG. 5.

If the conveyor 220 is running, camera 232 and LED 234 synchronization is retested under conditions correlated to actual conveyor 220 speed at step 43.

If a failure results at step 44 a report is generated at step 45 and is output to the user interface 212 at step 11 of FIG. 3. Success leads again to step 46 and the steps of FIG. 5 are initialized.

FIG. 5 is a logic flow diagram defining the steps taken in analyzing the imaging control settings. During this analysis, every buffer setting that may be modified by user input at the interface 212 is read.

The analysis is initiated at step 46 of FIG. 4 and cycles through a reading of variable buffers, i.e., at step 47 the variety of fruit selected is read, at step 48, the lighting colors selection is read, at step 49 the strobing pattern for presentation of the colors is read, at step 50 the color sequence is read, at step 51 the base intensity for the lighting is read and at step 52 the resolution setting, which is defined by strobe rate, is read.

Once the analysis has completed these readings, the analysis determines at step 53 whether it is to automatically select colors at step 54 predetermined to be optimal for use with the variety of fruit selected or whether user selected colors are to be used at step 55.

Next the analysis determines at step 56 whether predefined pattern parameters based on selected fruit variety are to be applied at step 57 or whether a particular pattern selected is to be applied at step 58.

Next the analysis determines whether a standard strobing sequence for the fruit variety is to be initiated at step 60 for whether the user has supplied a desired sequence to be applied at step 61.

The analysis then determines at step 62 whether the standard light intensity based on the selected variety of fruit is to be applied at step 63 or whether a user supplied intensity is to be applied at step 64.

The analysis then determines at step 65 whether the standard strobe rate based on the selected variety of fruit to produce a standard resolution is to be applied at step 66 or whether a user desired resolution is to be applied at step 67.

Once the analysis has gathered the above parameters, with such gathering being continuous and cyclic during the duration of processing and system 200 operation, the parameters are translated into machine code in a predefined sequence to set up a data stream at step 68 which will be output to imaging control after initiating a run time for the imaging control at step 69.

Figure 6:
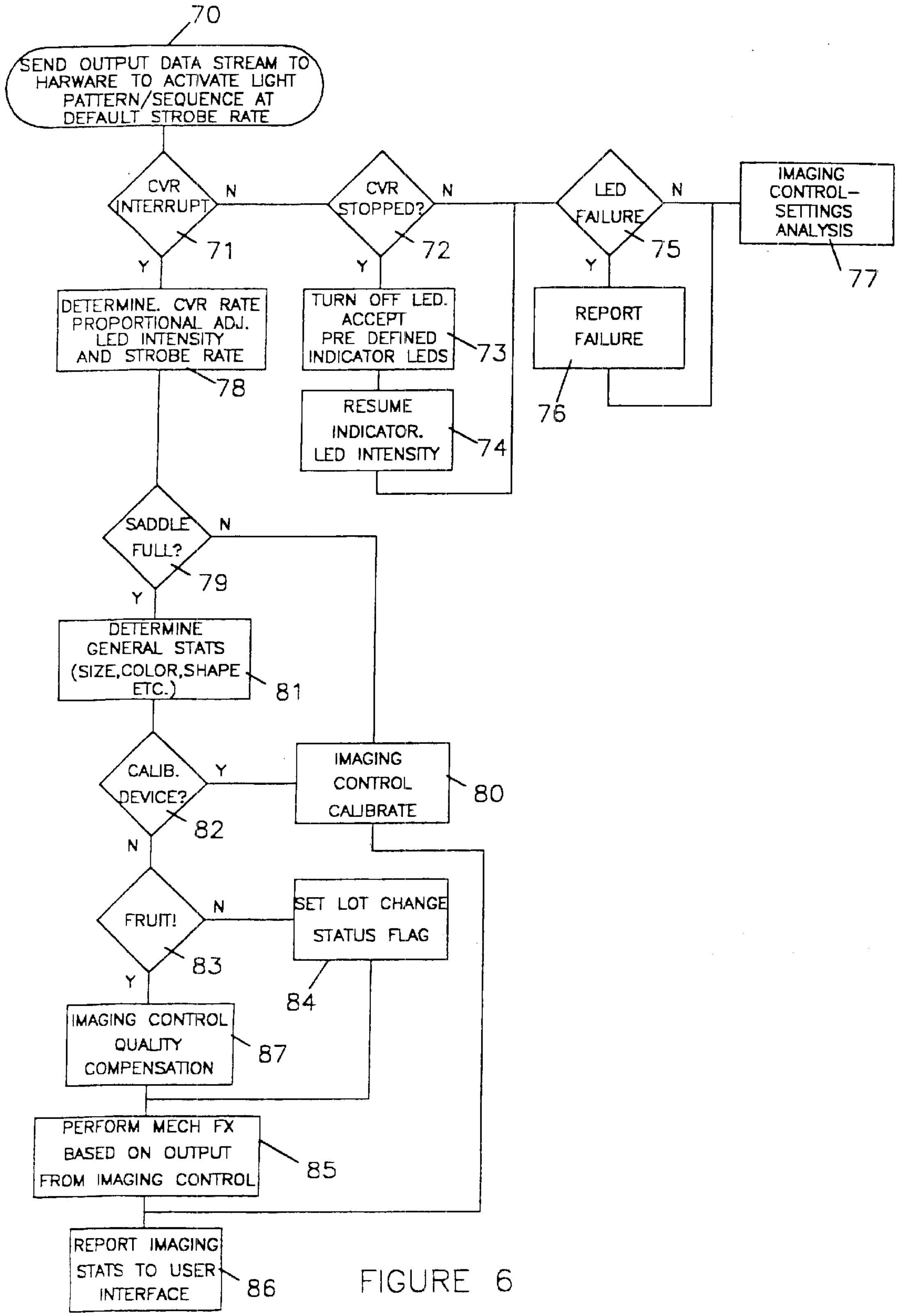
FIG. 6 is a logic flow diagram of the steps taken in applying the imaging control settings to the system and testing system compliance.

FIG. 6 is a logic flow diagram of the steps by means of which the imaging control run time elicits the appropriate system 200 actions.

At step 70, the data stream created by step 68 of FIG. 5 is supplied to the appropriate system 200 hardware for imaging unit 218 activation using parameters of light pattern, sequencing and strobe rate as defined by the data stream.

Once this activation has taken place, a determination is made as to whether a conveyor interrupt has been issued at step 71.

Such conveyor interrupt is a time based signal which is expected to issue at a particular interval to indicate that the conveyor 220 is moving at a rate indicated by the interval between interrupts thus presenting objects 222 carried thereon to the imaging system 218 at such rate.

Monitoring for the interrupts indicates whether the conveyor 220 is moving or not. If no interrupts are present, it is determined at step 72 that the conveyor 220 is not moving and LEDs 234 of the imaging unit 218 are turned off at step 73 except for those of a preselected color, such particular color LEDs 234 providing an indication of mechanical failure, and the intensity of the indicator LEDs 234 is reduced at step 74 to a level where the indicators are still visible but any adverse effect of continuous lighting thereof is negated.

The process then determines if there is a failure of the LEDs to light at step 75. If the LEDs 234 have failed an error report is generated at step 76 and the process returns at step 77 to analyzing the imaging control setting at step 47 of FIG. 5 with the report being output to the user interface 212 at step 16 of FIG. 3.

At step 78, if interrupts are present, the rate at which the conveyor 220 is moving is determined from the frequency of the interrupts and adjusts intensity and strobe rate of the LEDs 234 in a manner proportional to the rate at which the conveyor 220 is moving to maintain a target image resolution.

Figure 7:
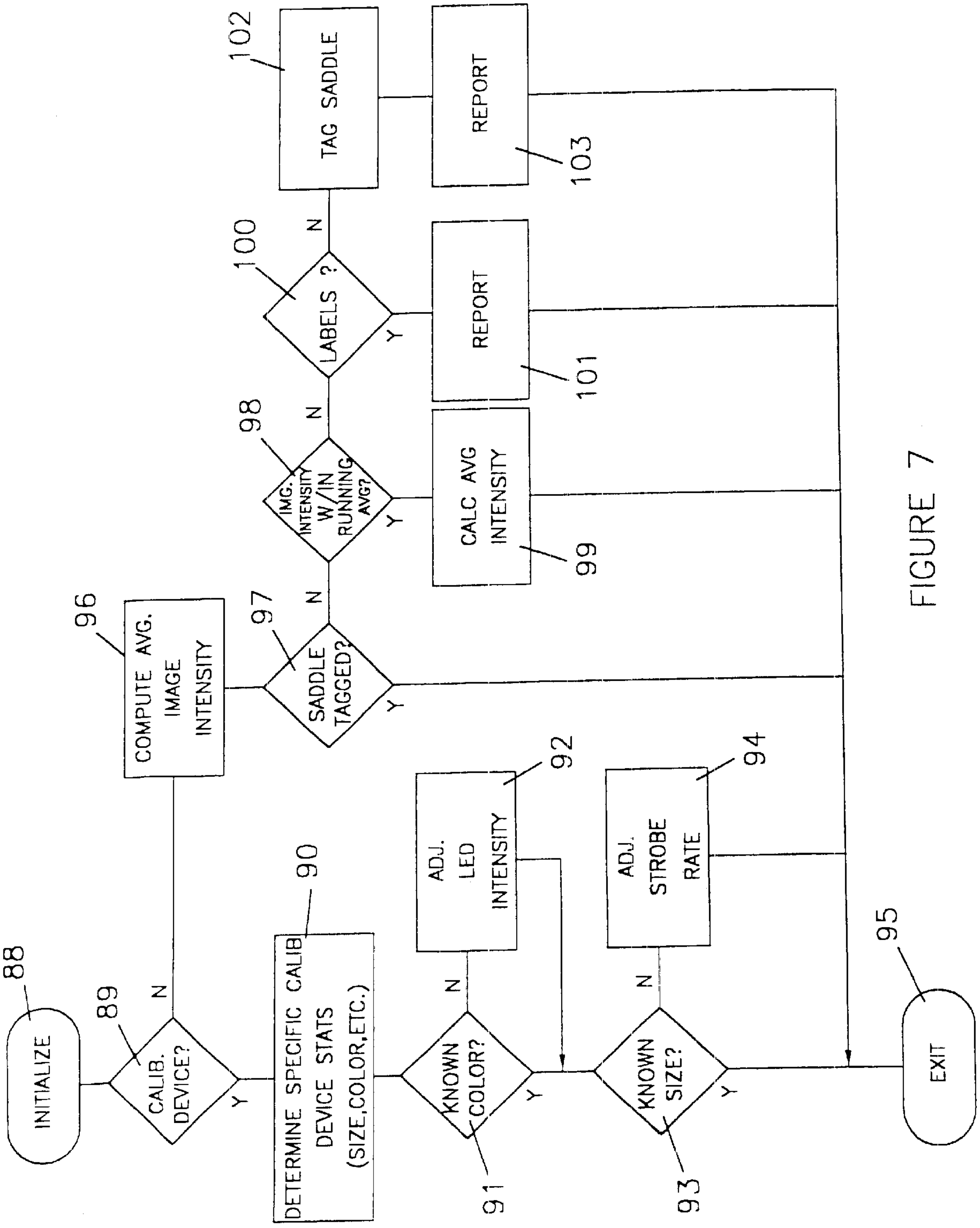
FIG. 7 is a logic flow diagram of the steps taken in calibrating the imaging control for the system, elicited by the steps of FIG. 6.

Once these parameters are modified to accommodate the rate of conveyor 220 motion, it is determined if an object 222 is present for imaging at step 79. If not object 222 is present, steps taken in calibrating imaging control as disclosed in FIG. 7 are initiated at step 80.

If an object 222 is present, the general statistics for the object 222 are determined at step 81. Such statistics include size, color, and shape parameters among others.

From the statistics, it is first determined at step 82 whether the object 222 is a calibration device. If so, the calibration steps of FIG. 7 are initiated at step 80.

If not, it is determined whether the object 222 is a piece of fruit at step 83. If the object 222 is not determined to be a fruit a determination that the object 222 is a lot change indicator is made and a status flag indicating a change in lot is set at step 84.

Then, at step 85, mechanical hardware system 200 components are activated to function in response to output from calibration of the imaging control at step 80, and a report of imaging statistics is generated at step 86 which is ultimately output to the user interface 212 at step 16 of FIG. 3, and the imaging control setting analysis of FIG. 5 is repeated.

Figure 8:
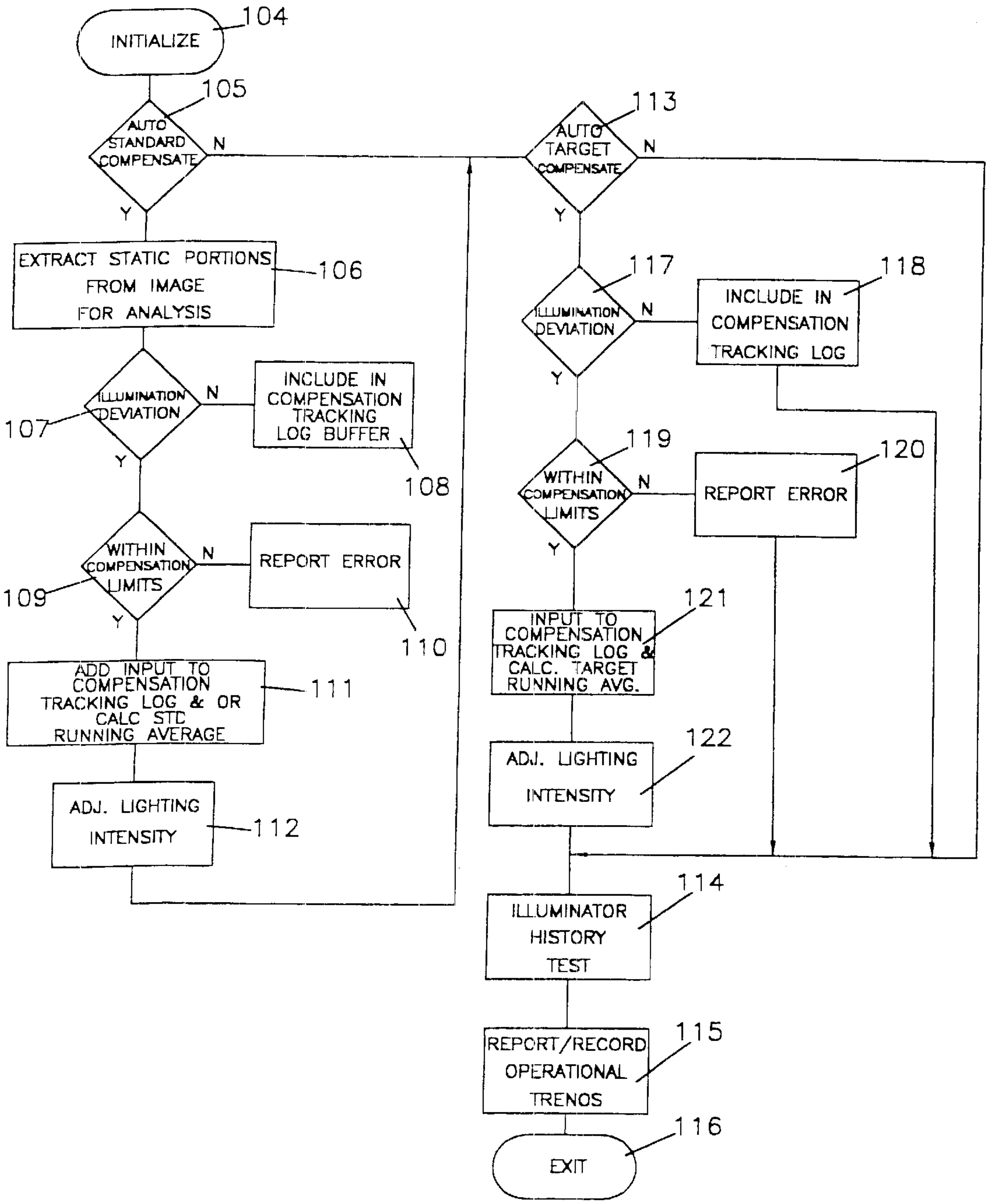
FIG. 8 is a logic flow diagram of the steps taken in imaging control quality compensation elicited by the steps of FIG. 6.

If, on the other hand, the determination at step 83 is made that the object 222 is a fruit, an imaging control quality compensation as detailed in FIG. 8 is initiated at step 87 with output therefrom being applied at step 87 as well to elicit the appropriate mechanical function of the system 200 hardware to obtain imaging at step 85.

Again, a report of imaging statistics is generated at step 86 which is ultimately output to the user interface 212 at step 16 of FIG. 3 and the imaging control settings analysis proceeds at step 77.

FIG. 7 is a logic flow diagram of the steps taken in calibrating the imaging control of the system 200.

Here, at step 88, when no object is detected at step 79, or when a calibration device is determined to be present at step 82 of FIG. 6, calibration is initialized.

The presence of a calibration device is verified at step 89 and if there is a verification, specific statistics such as size, color, etc. for the calibration device are determined at step 90.

In step 91 the color reading is tested to see if the parameter is within range. If not, an adjustment is made to the LED 234 intensity automatically at step 92.

If the color is found within range, the size reading is tested at step 93 to see if the parameter is within range. If not, the LED strobe rate is adjusted automatically at step 94.

If the size reading is within range, no further calibration is required and calibration ends at step 95, providing calibration parameters at step 80 of FIG. 6.

If at step 89, no calibration device is detected, at step 96 an average image intensity is computed. From this computation, a determination is made as to whether the particular saddle or conveyor position has been "tagged" at step 97. Tagging takes place when a functional or imaging discrepancy exists so that filling of the saddle with an object 222 is avoided. If the saddle is tagged, no further action is required and calibration ends, returning to step 80 of FIG. 6.

If the saddle is not tagged, a determination is made as to whether image intensity is within an expected running average range at step 98. If so, the measured parameter is incorporated into the running average as well as into average intensity for the imaging control at step 99 to avoid future error record generation, and calibration ends at step 95, returning its output to step 80 of FIG. 6.

If the imaging intensity is outside of range, the determination is made as to whether an interfering object 222, such as a misplaced fruit label, is within the saddle area at step 100.

If a label is identified, a report is generated at step 101, and calibration ends at step 95, with the report ultimately being output of the user interface 212 at step 86 of FIG. 6.

If no label is identified, a report is generated at step 103, and calibration ends at step 95, with the report ultimately being output to the user interface 212 at step 86 of FIG. 6.

FIG. 8 is a logic flow diagram of the steps taken in imaging control quality compensation identified at step 87 of FIG. 6 which initializes at step 104 when it is determined at step 83 that a piece of fruit to be imaged is present in the saddle.

At step 105 a determination is first made as to whether an automatic standard compensation is desired by a user.

In order to make such determination, a loop to the user interface 212 initialization process of FIG. 3 is created to look for input.

If none is found, static portions of an image are extracted for analysis at step 106.

The existence of static portions within an image may best be explained by stating that areas of space surrounding an object 222 to be imaged are invariably also imaged (within the confines of the imaging unit 218) and should look identical from image to image inasmuch as the areas of space have not moved, changed, been covered, etc. Thus such static portions when extracted may be analyzed by comparing for deviations from one image to the next.

At step 107, a determination of whether there is a comparative deviation in illumination of such static portions is made. If no deviation outside of an allowable range exists, the occurrence is added into a compensation tracking log buffer at step 108.

If an out of range deviation exists, a determination is made at step 109 whether the deviation is below a predefined limit within which automatic compensation can be accomplished by the process.

If the predefined limit is exceeded, correction requires user intervention and an error report is generated and output to the user interface 212 at step 110.

If the deviation does not exceed the limit, the occurrence is first added to the compensation tracking log buffer and a standard running average is calculated at step 111. Based on the running average calculated, lighting intensity is adjusted to eliminate the deviation at step 112.

It is then determined whether automatic target compensation is desired at step 113. It will be seen that this step also becomes a default step when user input indicates that automatic standard compensation is not desired at step 105.

Here again, user preference at step 17 of FIG. 3 is read and if not automatic target compensation is desired, step 114 is executed next and a history of illuminator operation is tested to provide statistics on system 200 operation which are studied to determine if improvements may be necessary.

Further, updated operational trends for the system 200 are reported to the user via the interface 212 and are recorded in a buffer at step 115 for study in perfecting the system 200.

At step 116, a return to step 87 of FIG. 6 is initiated, carrying input thereto which is incorporated to elicit optimum performance from the system 200.

If at step 113, no user input is read at the interface 212, automatic target compensation begins by determining whether a deviation in illumination exists at step 117.

If no deviation outside of an allowable range exists, the occurrence is added into a compensation tracking log buffer at step 118.

If an out of range deviation exists, a determination is made at step 119 whether the deviation is below a predefined limit within which automatic compensation can be accomplished by the process.

If the predefined limit is exceeded, correction requires user intervention and an error report is generated and output to the user interface 212 at step 120.

If the deviation does not exceed the limit, the occurrence is first added to the computation tracking log buffer and a target running average is calculated at step 121. Based on the target running average calculated, lighting intensity is adjusted to eliminate the deviation at step 122.

Once the intensity is adjusted, steps 114–116 described above are taken and the process returns to step 87 of FIG. 6 carrying input which is incorporated to elicit optimum system 200 operation.

As described above, the process of the present invention provides a number of advantages, some of which have been described above and others of which are inherent in the invention. Also, modifications may be proposed to the process without departing from the teachings herein. Accordingly, the scope of the invention is only to be limited as necessitated by the accompanying claims.

We claim:

1. A computer process for controlling operation of a system which sorts objects by surface characteristics, the system including a multi-rail conveyor having mechanical sorting capability, an imaging unit including at least one camera and at least one block of LEDs of multiple predetermined colors for each rail of the multi-rail conveyor, and a programmed computer including a user interface, the process comprising the steps of: initializing system hardware and software; setting the imaging unit to predefined operational parameters including LED color selection and LED intensity level; monitoring, modifying and reporting on operational parameters automatically; accepting, incorporating, translating into machine readable code, and applying user input when same is provided at the user interface in place of default process parameters stored within a memory of the computer; applying process parameters to synchronize operation of the imaging unit with conveyor action to produce optimum imaging; and using imaging output as the determinant for selective conveyor action to produce desired sorting.

2. The process of claim 1 wherein said step of initializing system hardware and software invokes a plurality of hardware and software functions.

3. The process of claim 2 further comprising the step of reading of imaging parameter data in a plurality of data buffers within a memory of the computer.

4. The process of claim 3 further comprising the steps of invoking control of the imaging unit and transmitting the read parameters thereto after determining operability of the imaging unit.

5. The process of claim 4 further comprising the step of monitoring and determining functionality and speed of conveyor operation.

6. The process of claim 5 further comprising the step of synchronizing operation of the camera and LEDs of the imaging unit and correlating synchronized imaging unit operation to conveyor speed to optimize imaging of objects carried by the conveyor.

7. The process of claim 6 further comprising the steps of reanalyzing data in the parameter buffers for user input, and replacing system default parameter data with provided user input in an output data stream automatically created and applied to hardware controllers by the process for controlled system operation.

8. The process of claim 7 further comprising the steps of activating system hardware using the generated data stream to set functional parameters, and determining whether the system is operating within parameter limits.

9. The process of claim 8 further comprising the steps of determining if an object is presented for imaging, identifying the presented object and following a series of predefined operations based on object identity.

10. The process of claim 9 further comprising the steps of gathering data generated by the predefined operations, modifying the data stream to incorporate the data, and controlling the performance of mechanical functions of the system based by communicating the gathered data via the data stream.

11. The process of claim 10 further comprising the steps of identifying a calibration device having known characteristics as the object and checking for accuracy in imaging output of such characteristics, and if necessary, modifying operational parameters to ensure imaging accuracy.

12. The process of claim 11 further comprising the steps of identifying an indicator having known characteristics as the object and setting a system flag in response to the identification.

13. The process of claim 12 further comprising the step of identifying a sortable object such as a piece of a particulate variety of fruit as the object.

14. The process of claim 13 further comprising the steps of sensing of an unidentifiable object, applying marking indicia to the location along the conveyor rail of the object, and generating a report of such action to the user at the interface.

15. The process of claim 14 further comprising the steps of analyzing standard imaging quality by comparing image output from a plurality of static portions of one image with identical portions of at least one other image, determining if a deviation below a defined upper limit for automatic compensation exists in the comparison, and automatically compensating for same by modifying selected operational parameters.

16. The process of claim 15 further comprising the steps of analyzing target image quality by comparing image output from a plurality of static portions of one image with identical portions of at least one other image, determining if a deviation below a defined upper limit for automatic compensation exists in the comparison, and automatically compensating for same by modifying selected operational parameters.

17. The process of claim 16 further comprising the steps of generating, storing and displaying error and process statistics for the system.

18. The process of claim 17 cycling continuously until user input generates an exit command.

19. The process of claim 18 wherein the operational parameters further include: fruit variety; LED color sequence; LED intensity level; LED lighting pattern; LED strobe rate/image resolution; conveyor speed; object identify; object color; object size; and object shape.

20. A programmed computer for controlling operation of a sorting system including the computer, a sorter conveyor rail and a cooperating imaging unit, comprising:

a memory having buffers for storing gathered operational parameters including LED color selection, LED color sequence, LED strobe rate, and LED intensity level translated into machine readable process code; and a processor for executing the process code stored in the memory;

wherein the process code includes code for gathering operational parameters from memory buffers containing default settings which may be overridden by user input from a user interface; translating the parameters into code readable by input/output process controllers for the conveyor rail and imaging unit, and executing the process code to produce desired mechanical sorting of objects on the conveyor rail by predefined parameters or surface characteristics as imaged by the imaging unit in response to the execution of the process code.

21. Computer executable machine readable process code stored on a computer readable medium which when executed causes mechanical sorting of objects on a sorter conveyor rail by predefined parameters of surface characteristics imaged by an imaging unit having a block of LEDs of multiple predetermined colors cooperatingly operational with said conveyor rail; the code comprising:

code to elicit user input at a user interface;

code to replace default code having parameters for LED color selection, LED color sequence, LED strobe rate, and LED intensity level in memory buffers of a computer with user input;

code to translate code in the buffers into a data stream readable by controllers of the conveyor rail and imaging unit;

code to execute the data stream code to initiate desired system operation in response thereto; and code to cause continuous looping through the process code.

22. Computer executable software process code stored on a computer readable medium for controlling operation of a sorting system comprising the computer, a conveyor rail, and a cooperating imaging unit having a block of LEDs of multiple predetermined colors, the code comprising:

code responsive to user input at a user interface to cause replacement of stored default operational parameters including for LED color selection, LED color sequence, LED strobe rate, and LED intensity level with user input options;

code for generating a machine readable data stream of the operational parameters;

code for executing the process defined by the data stream to optimize operation of the conveyor rail and cooperating imaging unit and elicit a desired sorting response; and code for creating a continuous loop in the process code.

23. A process for interacting with a computer to set operating parameter options and initiate a sorting operation, comprising the steps of:

initializing computer controlled hardware of and software for a sorting system including an imaging unit having a block of LEDs of multiple predetermined colors;

manipulating operating parameter options including LED color selection and LED intensity level through a user interface;

issuing a command to begin the sorting operation based on operating parameters presented; and monitoring operation to determine if further interaction is required.

24. A computer-executed process for controlling operation of a sorting system including an imaging unit having a block of LEDs of multiple predetermined colors, comprising the steps of:

gathering user input from a user interface;

creating operating parameters from default parameters in combination with gathered user input including LED color selection and LED intensity level;

creating a machine readable data stream of parameters;

applying the data stream to control means for machines of the sorting system;

determining appropriateness of machine response; and repeating process steps in a cyclical manner.

* * * * *

UNITED STATES PATENT AND TRADEMARK OFFICE

CERTIFICATE OF CORRECTION

PATENT NO. : 6,600,829 B1
DATED : July 29, 2003
INVENTOR(S) : Affeldt et al.

It is certified that error appears in the above-identified patent and that said Letters Patent is hereby corrected as shown below:

Column 2,
Line 7, change "for" to -- by --
Line 47, change "use" to --user --
Line 56, change "not" to -- no --

Column 4,
Line 9, change "to" to -- of --
Line 49, change "for" to -- or --

Column 5,
Line 4, change "by" to -- at --
Lines 30 and 61, change "setting" to -- settings --
Line 42, change "not" to -- no --

Column 6,
Line 46, change "of" to -- to --

Column 7,
Line 27, change "not" to -- no --
Line 52, change "computation" to -- compensation --

Column 9,
Line 2, change "particulate" to -- particular --
Line 10, change "imaging" to -- image --

Column 19,
Line 4, change "identify" to -- identity --

Signed and Sealed this

Sixteenth Day of September, 2003

JAMES E. ROGAN
*Director of the United States Patent and Trademark Office*